(12) United States Patent
Davis et al.

(10) Patent No.: US 6,699,028 B2
(45) Date of Patent: Mar. 2, 2004

(54) INSERT MOLDING APPARATUS

(75) Inventors: John W. Davis, Cleveland, TN (US); Randall K. Fisher, Germantown, TN (US); Joseph J. Noble, Jr., Athens, TN (US)

(73) Assignee: Schering-Plough HealthCare Products, Inc., Memphis, TN (US)

( * ) Notice: Subject to any disclaimer, the term of this patent is extended or adjusted under 35 U.S.C. 154(b) by 39 days.

(21) Appl. No.: 09/981,197

(22) Filed: Oct. 16, 2001

(65) Prior Publication Data

US 2003/0070321 A1 Apr. 17, 2003

(51) Int. Cl.⁷ .......................... B29C 70/78; B29C 45/14
(52) U.S. Cl. ..................... 425/125; 425/125; 425/127; 425/129.2
(58) Field of Search ................................ 425/119, 125, 425/127, 129.2; 264/247

(56) References Cited

U.S. PATENT DOCUMENTS

| | | | | |
|---|---|---|---|---|
| 2,241,599 A | * | 5/1941 | Hoza | 264/244 |
| 3,319,301 A | * | 5/1967 | Ludwig | 425/119 |
| 3,439,384 A | * | 4/1969 | Crossen et al. | 425/119 |
| 3,840,310 A | * | 10/1974 | Klee et al. | 425/119 |
| 4,149,696 A | * | 4/1979 | Koch et al. | 249/83 |
| 4,988,282 A | * | 1/1991 | Fukui | 425/4 R |
| 5,725,823 A | * | 3/1998 | Finn et al. | 264/247 |
| 5,840,225 A | * | 11/1998 | Kikuchi et al. | 264/46.6 |
| 6,054,087 A | * | 4/2000 | Noirot et al. | 264/251 |
| 6,439,537 B1 | * | 8/2002 | Fujisawa et al. | 249/85 |

FOREIGN PATENT DOCUMENTS

| | | | | |
|---|---|---|---|---|
| FR | 2412736 A | * | 8/1979 | B29D/27/00 |
| JP | 61062487 A | * | 3/1986 | B29C/45/14 |
| JP | 07148865 A | * | 6/1995 | B29D/31/50 |

* cited by examiner

*Primary Examiner*—Robert B. Davis
(74) *Attorney, Agent, or Firm*—Robert A. Franks (57) ABSTRACT

An apparatus for making a molded article containing an insert includes an upper mold half and a lower mold half for mating with the upper mold half to provide a mold cavity therein. Either mold half can include a recess, an elevator opening in a lower portion of the recess, and an inwardly directed lip at an upper portion of the elevator opening. An elevator mechanism is provided which includes a lifter for supporting an insert to be secured to the article during a molding operation, and a lifting arrangement for raising and lowering the lifter through the elevator opening such that a peripheral edge of the insert supported on the lifter is clamped between the lifter and the lip when the lifting arrangement raises the lifter.

11 Claims, 12 Drawing Sheets

INSERT MOLDING APPARATUS

INTRODUCTION TO THE INVENTION

The present invention relates generally to a molded article having an insert embedded therein, as well as an apparatus and method for making the same.

It is known to provide shoe insoles with inserts located in recesses thereof. The material of the insert generally has different characteristics from the material of the remainder of the insole to provide a specialized effect, such as a greater degree of cushioning under specific portions of the foot.

Generally, such inserts have been attached within recesses or pockets at the lower surface of a formed insole, such as by means of adhesives. However, the use of an adhesive provides various disadvantages. Specifically, it is difficult to maintain the entire insert in full contact with the insole when securing the same. This becomes even more evident as the size of the insert increases. There is thus a problem with product quality and consistency. Further, in some cases, because of the nature of materials used to form the insole, it is difficult for the adhesive to adhere to the insole. This adherence problem can also be due to the presence of mold release agent residues from the molding operation. As a result, specialized glues are required. Also, the operation requires additional labor and handling to glue the inserts, thereby increasing costs.

Several attempts have been made to mold inserts directly into insoles. Examples are described in U.S. Pat. Nos. 4,674,204 and 4,910,886. However, a problem frequently occurs with staining of the inserts from the molding material. In some cases, because of the porosity of the insert and the large pressure applied to the liquid polymer substances during the molding operation, the liquid penetrates into the insert. This results in an unsightly, non-uniform or irregular staining of the insert. The penetration of the molding polymer into the insert also changes the rigidity of the insert, that is, making it harder, and thereby changing the performance thereof.

As mentioned above, fluid polymer-forming materials sometimes tend to flow into the porous structure of the inserts due to the high pressure in the cavity. As an example, there is a chemical reaction with liquid urethanes (preferred materials for making many types of insoles), which releases a gas such as $CO_2$. This chemical reaction causes the urethane components to expand from 120% to 200%–300% of the original volume of the liquid urethane. Since the mold is a closed mold and since the liquid urethane expands therein, there is a large increase in internal cavity pressure, so that a large external pressure must be applied to maintain the mold in a closed condition. Therefore, there is a pressure drop of about 15 to 20 psig (1.03 to $1.38 \times 10^5$ Newton/meter$^2$) across the inserts, that is, from the upper surfaces of the inserts to the lower surfaces thereof. Also, the inserts are open to atmospheric pressure at their sides. Because of this, the liquid urethane flows into the cells of the porous structure of the inserts, which result in the inserts becoming more rigid and less resilient, while also causing the aforementioned staining.

In addition to the penetration through the insert, the liquid urethane tends to leak around to the underside of the insert during the molding operation, between the insert and the surface of the mold, causing a thin overcoat layer on the exposed surface of the insert around the edges of the insert. Any seals which are provided to prevent migration of the liquid urethane around the insert during the molding operation have not been very successful, and still permit this type of overflow to the underside. A reason for this overflow is the large pressure applied to the liquid urethane during the molding operation. As a result, this overflow layer provides an unsightly visual defect on the bottom surface of the insole. Because such overflow layers are not uniform, the insoles have an appearance of poor quality.

There is a further problem with such molded inserts. Specifically, it is difficult to maintain the position of the inserts during the molding operation as liquid polymer components are introduced into the mold, since the inserts tend to float on the liquid polymer.

SUMMARY OF THE INVENTION

Accordingly, it is an object of the present invention to provide a molded article having an insert embedded therein, as well as an apparatus and method for making the same, that overcomes problems with the aforementioned prior processes.

It is another object of the present invention to provide a shoe insole having a properly positioned insert embedded therein, as well as an apparatus and method for making the same, in which there is no staining or overflow layer on the inserts.

It is still another object of the present invention to provide a shoe insole having an insert embedded therein, as well as an apparatus and method for making the same, in which a retainer with an upper lip is provided around the periphery of each insert during the molding operation to provide a seal that prevents flow of the liquid urethane around the peripheral edges of the insert and also properly positions the inserts into the insert cavity of the insole.

It is yet another object of the present invention to provide a shoe insole having an insert embedded therein, as well as an apparatus and method for making the same, having an elevator mechanism that permits the inserts to be inserted into the dammed area and under the lip and thereafter clamps the peripheral edges of the inserts between the elevator mechanism and the lip to provide a seal against the flow of molding material under the insert.

It is a further object of the present invention to provide a shoe insole having an insert embedded therein, as well as an apparatus and method for making the same, in which a barrier layer may be provided on a permeable insert in order to prevent penetration of the liquid molding material into the insert during the molding operation.

It is a still further object of the present invention to provide a shoe insole having an insert embedded therein, as well as an apparatus and method for making the same, that is easy and economical to make and use.

In accordance with an aspect of the present invention, an apparatus for making a molded article containing an insert includes an upper mold half and a lower mold half for mating with the upper mold half to provide a mold cavity therein. Either mold half can include a recess, an elevator opening in a lower portion of the recess, and an inwardly directed lip at an upper portion of the elevator opening. An elevator mechanism is provided which includes a lifter for supporting an insert to be secured to the article during a molding operation, and a lifting arrangement for raising and lowering the lifter through the elevator opening such that a peripheral edge of the insert supported on the lifter is clamped between the lifter and the lip when the lifting arrangement raises the lifter.

Any lifter actuation mechanism can be used. One such lifter mechanism includes a base positioned below the lower mold half, and a cylinder mounted to the base and including a movable piston rod connected with the lifter for raising and lowering the lifter. The base includes a recess for mounting the cylinder.

In one embodiment, a retainer is removably connected to the lower mold half within the elevator opening. The retainer includes a dam flush with and removable from an inner wall defining the elevator opening, as well as the inwardly extending lip which is connected to an upper end of the dam. The retainer further includes a lower outwardly extending connector connected with a lower end of the dam and removably secured to a lower surface of the lower mold half.

In another embodiment, the lifting arrangement includes an upper slide plate having a lower inclined cam surface, the lifter being connected to the upper slide plate; a lower slide plate having an upper inclined cam surface in contact with the lower inclined cam surface; and a moving arrangement for sliding the lower slide plate relative to the upper slide plate in order to raise and lower the upper slide plate and the lifter.

Preferably, for producing shoe insoles, the lower mold half includes two such recesses corresponding to left and right insoles to be molded, one elevator opening in a lower portion of each recess, and one inwardly directed lip at the upper portion of each elevator opening. In such case, the elevator mechanism includes two lifters for supporting an insert in correspondence with each recess; and the lifting arrangement raises and lowers the two lifters such that a peripheral edge of each insert supported on each respective lifter is clamped between the lifter and the respective lip when the lifting arrangement raises the lifters.

In accordance with another aspect of the present invention, a method for making a shoe insole includes the step of providing an upper mold half and a lower mold half for mating with the upper mold half to provide a molded part cavity therein, either the lower mold half or the upper mold half including an elevator opening, and an inwardly directed lip at a cavity side of the elevator opening. Then, an insert to be secured to the shoe insole is supported on a lifter positioned in the elevator opening during a molding operation. The lifter is then moved such that a peripheral edge of the insert supported on the lifter is clamped between the lifter and the lip when the lifting arrangement moves the lifter adjacent the inwardly directed lip, and a molding material is supplied to the cavity. The mold halves are then closed while the molding material fills the cavity, and the insole is formed.

Further, according to the method, the mold halves are opened after the insole has been formed. The lifter is lowered after the insole is formed to facilitate demolding such that the peripheral edge of the insert supported on the lifter is no longer clamped between the lifter and the lip. Thereafter, the formed insole can be removed from the mold.

If the insert is a permeable material such as an open-cell foam, then a barrier layer may be provided on the insert prior to introducing the molding material in contact with the insert to prevent the molding material from penetrating through the insert. If the insert is not a permeable material, no barrier layer is usually required.

Any mechanism can be used to hold the insert in a flat position during lifter actuation, and which is removed when the insert is clamped in place. As an example, a weight may be provided having the same shape as the insert and positioned on top of the insert prior to raising the lifter in order to keep the insert flat and facilitate clamping of the insert under the lip around the entire insert periphery. The weight is removed prior to closing the mold halves together.

In accordance with still another aspect of the present invention, an insole for use with footwear includes a first layer having a lower shallow recess and a first set of properties such as cushioning, hardness, density, resilience and/or color; and an insert secured in the recess and being made of a material with a second set of properties such as cushioning, hardness, density, resilience and/or color, which may be different from the first set of properties, the insert having an upper surface secured to the first layer in the recess, and a peripheral portion of the upper surface being free and unsecured to the first layer in the recess.

Preferably, the first layer includes a forefoot portion extending generally at least to the position of the metatarsals of the foot; a heel portion; a mid portion connecting together the forefoot portion and the heel portion; an upper surface extending along the forefoot, mid and heel portions and on which a person stands; and a lower surface extending along the forefoot, mid and heel portions, the lower surface including the lower shallow recess. The insert also preferably has a barrier layer on an upper surface thereof to prevent a molding material from penetrating the insert during a molding operation. However, the present invention is not limited to full length insoles, but can be used with three-quarter length insoles, foot pads, etc.

The above and other features of the invention will become readily apparent from the following detailed description thereof which is to be read in connection with the accompanying drawings.

DETAILED DESCRIPTION

The invention will be explained herein with reference to the manufacture of shoe insoles, although those skilled in the art will recognize that the equipment and method can advantageously be applied to producing other insert molded products, and will be particularly useful in any situation where flexible insert materials are to be used.

Referring to the drawings in detail, and initially to FIGS. 1–7, a left insole 10 and a right insole 11 are shown, similar to those which have been described in copending U.S. patent application Ser. No. 09/476,642, filed on Dec. 31, 1999 and having the same assignee herewith. The entire disclosure of said U.S. patent application Ser. No. 09/476,642 is incorporated herein by reference.

For clarity of description, the following discussion will generally be limited to only left insole 10, it being readily understood that the manufacture and properties of a right foot insole are generally similar.

Figure 1:
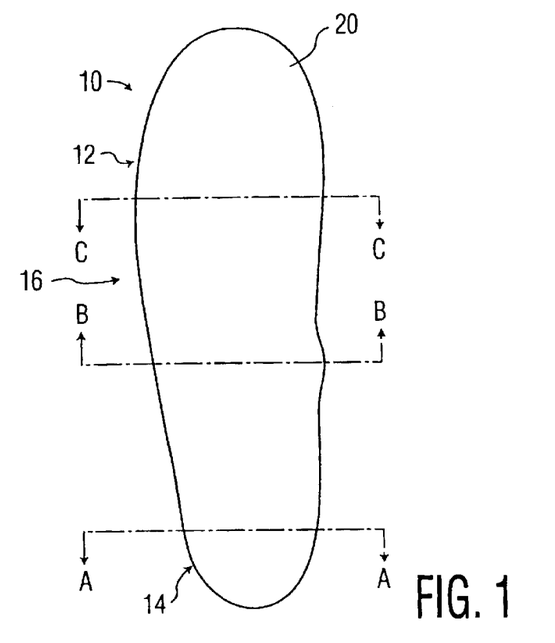
FIG. 1 is a top plan view of a left shoe insole according to the present invention.
Figure 2:
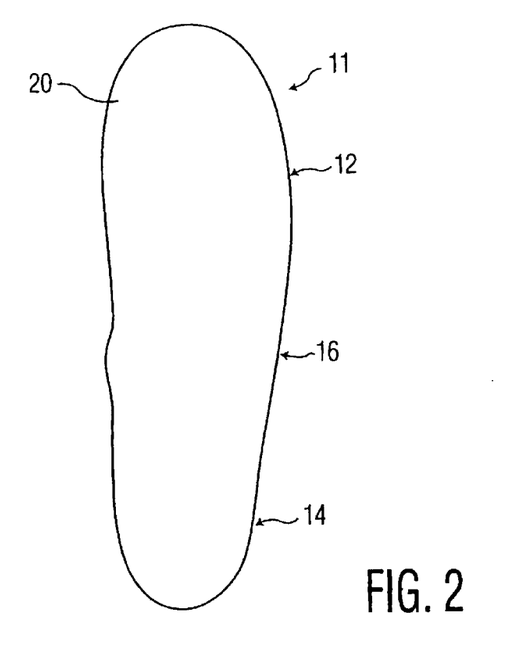
FIG. 2 is a top plan view of a right shoe insole according to the present invention.
Figure 3:
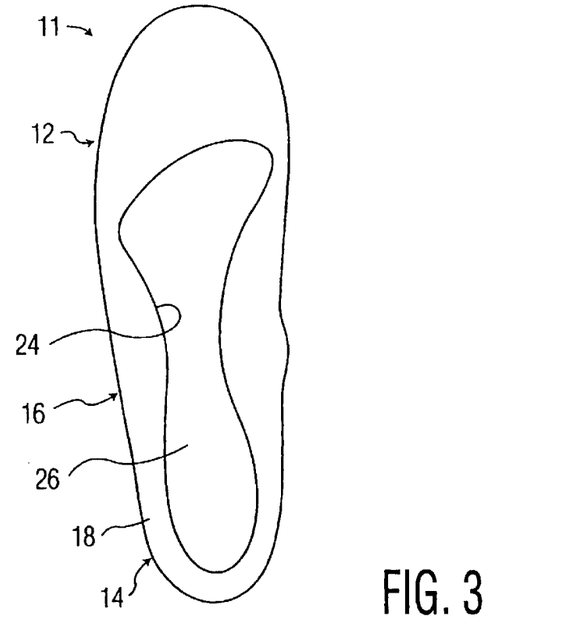
FIG. 3 is a bottom plan view of the right insole of FIG. 2.
Figure 4:
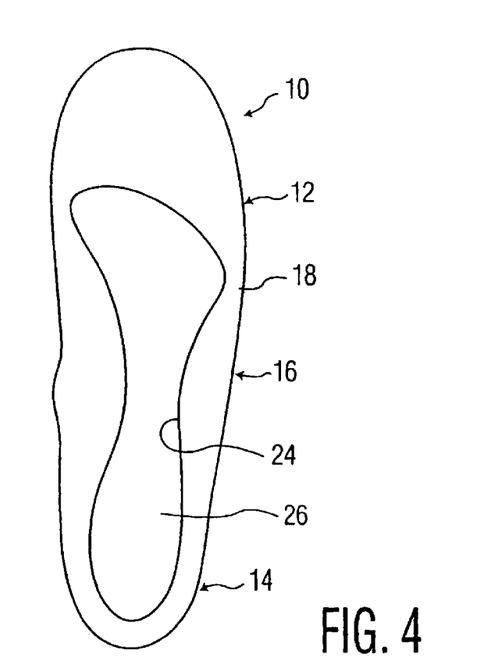
FIG. 4 is a bottom plan view of the left insole of FIG. 1.
Figure 5:
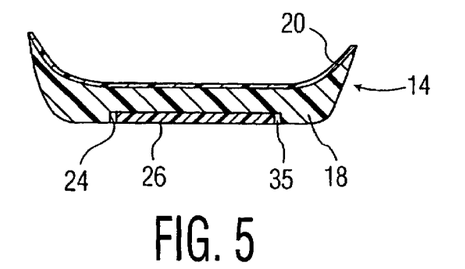
FIG. 5 is a cross-sectional view of the left insole, taken along line A—A of FIG. 1.

As shown, insole 10 has the shape of a human left foot and therefore includes a curved toe or forefoot portion 12, a cupped heel portion 14, and a mid portion 16 which connects forefoot portion 12 and heel portion 14 together. Heel portion 14 generally, but not always, will have a greater thickness than toe portion 12. For example, heel portion 14 can have a thickness of about 4–8 mm, while toe portion can have a thickness of about 1–6 mm.

Insole 10 is formed by a lower layer 18 and a top cover 20 secured to the upper surface of lower layer 18, along forefoot portion 12, cupped heel portion 14 and mid portion 16, by any suitable means, such as adhesives, radio frequency welding, etc. Preferably, top cover 20 is secured to lower layer 18 when lower layer 18 is molded in position, as will be explained in greater detail hereinafter.

Lower layer 18 can be made from any suitable material including, but not limited to, any flexible material which can cushion and absorb the shock from heel strike on the insole. Suitable shock absorbing materials can include any suitable foam, such as, but not limited to, cross-linked polyethylene, poly(ethylene-vinyl acetate), polyvinyl chloride, synthetic and natural latex rubbers, neoprene, isoprene, block polymer elastomers of the acrylonitrile-butadiene-styrene or styrene-butadiene-styrene type, thermoplastic elastomers, ethylenepropylene rubbers, silicone elastomers, polystyrene, polyureas or polyurethanes; more preferably a polyurethane foam made from flexible polyol chains and an isocyanate such as a monomeric or prepolymerized diisocyanate based on 4,4'-diphenylmethane diisocyanate (MDI) or toluene diisocyanate (TDI). Such foams can be blown with chlorofluorocarbons, hydrofluorocarbons, water, methylene chloride or other gas producing agents, as well as by mechanically frothing to prepare the shock absorbing resilient layer. Such foams advantageously can be molded into the desired shape or geometry. Non-foam elastomers such as the class of materials known as viscoelastic polymers, or silicone gels, which show high levels of damping when tested by dynamic mechanical analysis performed in the range of $-50°$ C. to $100°$ C. may also be advantageously employed. A resilient polyurethane can be prepared from diisocyanate prepolymer, polyol, catalyst and stabilizers which provide a waterblown polyurethane foam of the desired physical attributes. Suitable diisocyanate prepolymer and polyol components include polymeric MDI M-10 (CAS 9016-87-9) and Polymeric MDI MM-103 (CAS 25686-28-6), both available from BASF, Parsippany, N.J.; Pluracol 945 (CAS 9082-00-2) and Pluracol 1003, both available from BASF, Parsippany, N.J.; Multrinol 9200, available from Bayer, Pittsburgh, Pa.; MDI diisocyanate prepolymer XAS 10971.02 and polyol blend XUS 18021.00 available from the Dow Chemical Company, Midland, Mich. These urethane systems generally contain a surfactant, a blowing agent, and an ultra-violet stabilizer and/or catalyst package. Suitable catalysts include Dabco 33-LV (CAS 280-57-9,2526-71-8), Dabco X543 (CAS Trade Secret), Dabco T-12 (CAS 77-58-7), and Dabco TAC (CAS 107-21-1) all obtainable from Air Products Inc., Allentown, Pa.; Fomrez UL-38, a stannous octoate, from the Witco Chemical Co., New York, N.Y.; or A-1(CAS 3033-62-3) available from OSI Corp., Norcross, Ga. Suitable stabilizers include Tinuvin 765 (CAS 41556-26-7), Tinuvin 328 (CAS 25973-55-1), Tinuvin 213 (CAS 104810-48-2), Irganox 1010 (CAS 6683-19-8), Irganox 245 (CAS 36443-68-2), all available from the Ciba Geigy Corporation, Greensboro, N.C., or Givsorb UV-1 (CAS 057834-33-0) and Givsorb UV-2 (CAS 065816-20-8) from Givaudan Corporation, Clifton, N.J. Suitable surfactants include DC-5169 (a mixture), DC190 (CAS 68037-64-9), DC197 (CAS 69430-39-3) and DC-5125 (CAS 68037-62-7) all available from Air Products Corp., Allentown, Pa. Alternatively, lower layer 18 can be a laminate construction, that is, a multilayered composite of any of the above materials. Multilayered composites are made from one or more of the above materials such as a combination of polyethylene vinyl acetate and polyethylene (two layers), a combination of polyurethane and polyvinyl chloride (two layers) or a combination of ethylene propylene rubber, polyurethane foam and ethylene vinyl acetate (3 layers).

Preferably, lower layer 18 is made from a urethane molded material.

Note that, where available, Chemical Abstracts Service ("CAS") registration numbers have been provided for the various chemical substances mentioned above.

Top cover 20 can be made from any suitable material including, but not limited to, fabrics, leather, leatherboard, expanded vinyl foam, flocked vinyl film, coagulated polyurethane, latex foam on scrim, supported polyurethane foam, laminated polyurethane film or in-mold coatings such as polyurethanes, styrene-butadiene-rubber, acrylonitrile-butadiene, acrylonitrile terpolymers and copolymers, vinyls, or other acrylics, as integral top covers. Desirable characteristics of top cover 20 include good durability, stability and visual appearance. It is also desirable that top cover 20 has good flexibility, as indicated by a low modulus, in order to be easily moldable. The bonding surface of top cover 20 should provide an appropriate texture in order to achieve a suitable mechanical bond to the upper surface of lower layer 18. Preferably, the material of top cover 20 is a fabric, such as a brushed knit laminate top cloth (brushed knit fabric/urethane film/non-woven scrim cloth laminate) or a urethane knit laminate top cloth. Preferably, top cover 20 is made from a polyester fabric material.

Although the present invention has been used with top cover 20, the present invention does not require top cover 20.

According to the present invention, lower layer 18 is prepared by open pour molding, followed by secondary die cutting or in-mold die cutting.

During use, insole 10 is placed in a shoe so that the medial side of mid portion 16 rests against the inside of the shoe. Forefoot portion 12 may end just in front of the metatarsals. However, insole 10 is preferably a full length insole, that is, extends along the entire foot.

Typically, insole 10 would be sized corresponding to shoe sizes and would be provided in sized pairs. According to prior U.S. patent application Ser. No. 09/476,642, insole 10 is formed with a structure to alleviate lower back pain and lower extremity pain. Specifically, insole 10 is provided with a shallow recess 24 about 2 mm deep at the lower surface of lower section 18. An insert 26 having a thickness of about 2 mm and having the same shape as shallow recess 24, is secured within shallow recess 24. Insert 26 is made from a softer or more cushioning material than the remainder of lower section 18 of insole 10. For example, lower section 18 of insole 10 can be made from a urethane foam having a Shore "00" durometer hardness in the range of approximately 45–75, more preferably in the range of approximately 55–65, and with a preferred hardness of approximately 60, while insert 26 can be made from a softer urethane foam having a Shore "00" durometer hardness in the range of approximately 35–65, more preferably in the range of approximately 45–55, and with a preferred hardness of approximately 50. A preferred material for insert 26 is the material sold by Rogers Corporation of Rogers, Conn. under the trademark "PORON". However, other compressible and even non-compressible materials can be used for insert 26, such as a gel, elastomer, various composites, etc. As will be explained hereinafter, insert 26 is formed first and then placed in a mold, where the remainder of lower section 18 of insole 10 is molded thereon, and thereby bonded to the PORON material of insert 26 during the molding operation.

Although the discussion of the present invention uses the term "insole," it will be appreciated that the use of other equivalent or similar terms such as "innersole" or "shoe insert" are considered to be synonymous and interchangeable, and thereby included within the present claimed invention. The term "insole" is also intended to encompass other foot support and protection pads, such as heel cups, arch supports, three-quarter length insoles and heel pads.

As discussed above, there have been various problems with forming insert 26 in insole 10, either with adhesive or in a molding operation.

Accordingly, an apparatus 110 according to a first embodiment of the present invention will now be described for manufacturing insole 10 with insert 26 in a molding operation, without the use of an adhesive, and which overcomes the aforementioned problems.

As shown in FIGS. 8–12, apparatus 110 includes a bottom cavity mold 112 having two lower mold cavities 114 therein shaped to mold the lower halves of left and right shoe insoles 10. Bottom cavity mold 112 includes a substantially flat raised sealing surface 135 surrounding lower mold cavities 114. The sealing surface 135 can be inclined or curved from the front to the rear thereof. Each lower mold cavity 114 has side walls 118 that incline downwardly from raised sealing surface 135.

Figure 12:
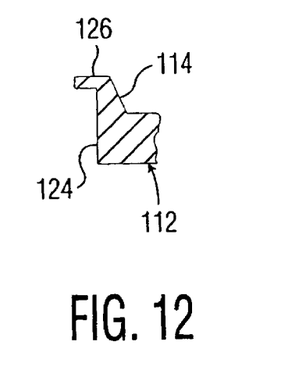
FIG. 12 is a cross-sectional view of the bottom cavity mold of FIG. 10, taken along line E—E thereof.

According to an important aspect of the present invention, an elevator opening 124 is formed in the lower surface of each lower mold cavity 114 and has the outer peripheral shape and dimensions of insert 26 to be placed in each lower mold cavity 114 of the mold during the molding operation. Elevator opening 124 includes an inwardly directed lip 126 at the upper end thereof, the purpose for which will be understood from the discussion hereinafter. The maximum size of lip 126 is determined by the ease of de-molding and the extent to which the edge of insert 26 needs to be attached to the insole. The minimum amount of the inward extent of lip 126 is that which is required to create a proper seal. As an example, lip 126 preferably extends inwardly for a distance in the range of about 0.005 inch to 0.100 inch (0.12 to 2.54 mm), and more preferably 0.01 inch (0.25 mm). The greater the inner extension of lip 126, the better lip 126 functions to hold the flexible insert under lip 126 and maintain a seal against the liquid urethane from flowing under the insert, that is, there is less chance of overflow to the underside, but the harder it is to remove the finished insole from the mold. Thus, the inner extension distance of lip 126 will depend on the rigidity of the material of insert 26, the pressure exerted by the liquid urethane inserted into the mold and the difficulty of removing the finished insole from the mold. As shown in FIG. 12, the portion of bottom cavity mold 112 that connects to lip 126 increases in thickness away from lip 126. This provides additional strength. However, the present invention is not limited and such connection can be of uniform thickness as well.

Although lip 126 is shown as being integrally connected with bottom cavity mold 112, it is preferable that lip 126 be formed as a removable member. In this regard, and referring to FIG. 12A, a removable retainer 125 can be provided at elevator opening 124. Removable retainer 125 includes a dam 127 flush with the vertical wall of mold 112, the inside constituting elevator opening 124, a lower outwardly extending connector 129 connected with the lower end of dam 127 and which is secured to the lower surface of bottom cavity mold 112 by bolts 131 and an inwardly extending lip 126' connected to the upper end of dam 127. The reason for providing a removable retainer 125 is that retainer 125 can be replaced in the event of damage to lip 126', without changing the entire bottom cavity mold 112. Further, with this arrangement, the height of lip 126' can be adjusted, for example, by using spacers between lower connector 129 and the lower surface of bottom cavity mold 112. Alternatively, to adjust the height of lip 126', retainer 125 can be replaced by a new retainer having a different height of dam 127. Alternatively, the lip length of lip 126' can be varied.

Figure 12A:
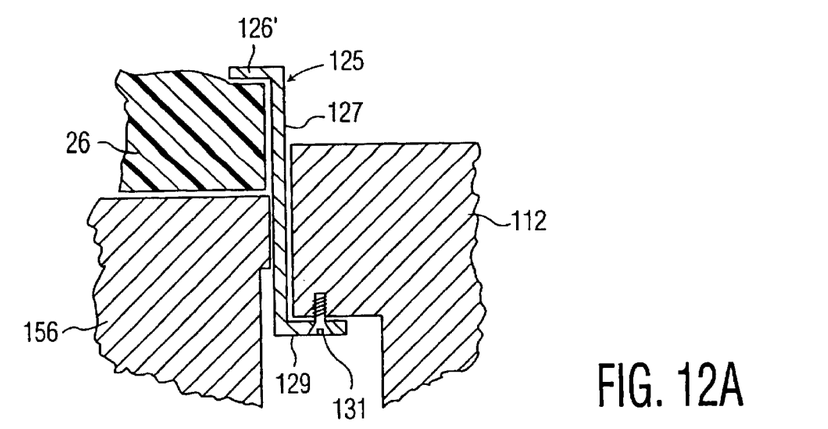
FIG. 12A is a cross-sectional view similar to FIG. 12, but showing a modified embodiment of the present invention.
Figure 12B:
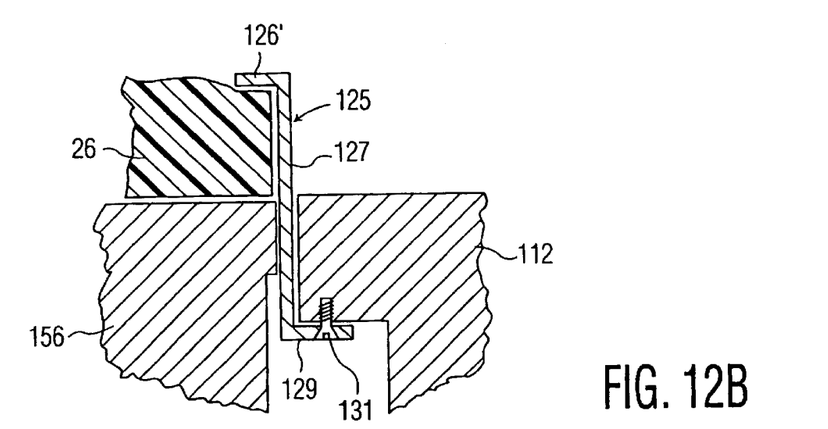
FIG. 12B is a cross-sectional view similar to FIG. 12, but showing a further modified embodiment of the present invention.
Figure 12C:
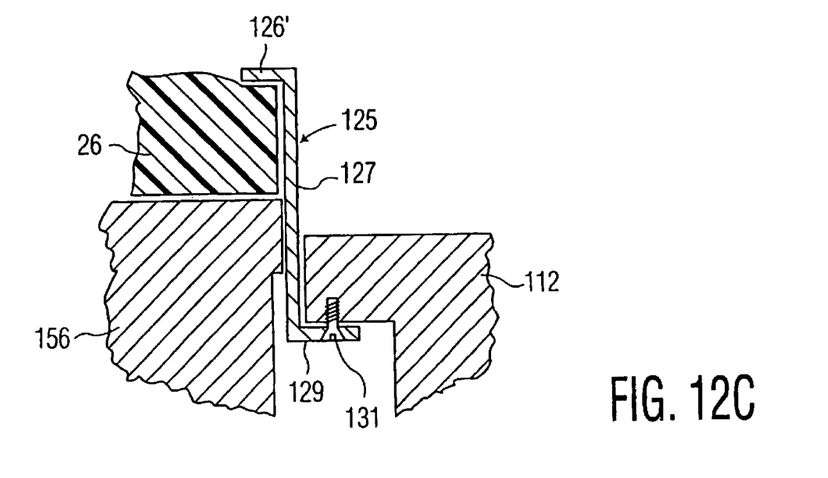
FIG. 12C is a cross-sectional view similar to FIG. 12, but showing a still further modified embodiment of the present invention.
Figure 13:
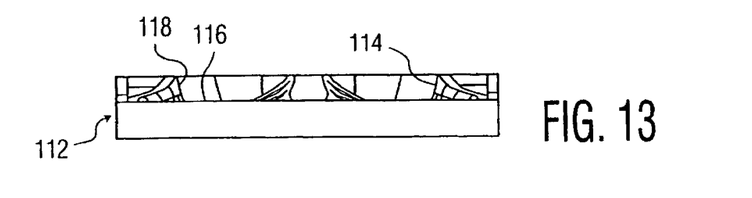
FIG. 13 is a front elevational view of the bottom cavity mold.
Figure 14:
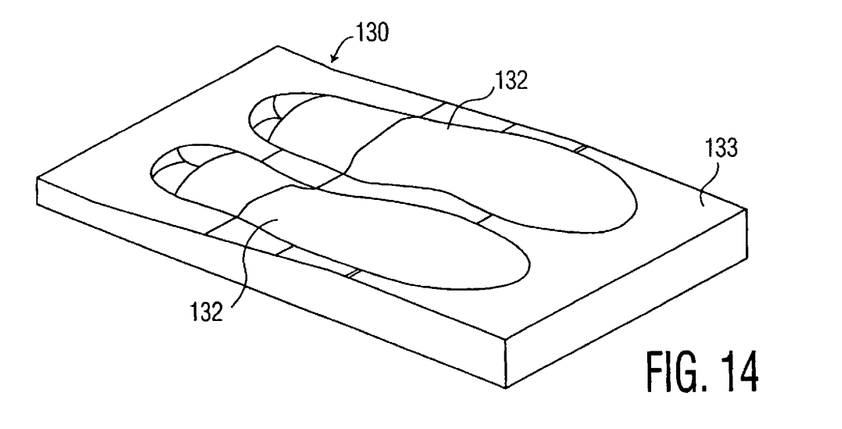
FIG. 14 is a bottom perspective view of the top core mold of the apparatus of FIG. 8.
Figure 15:
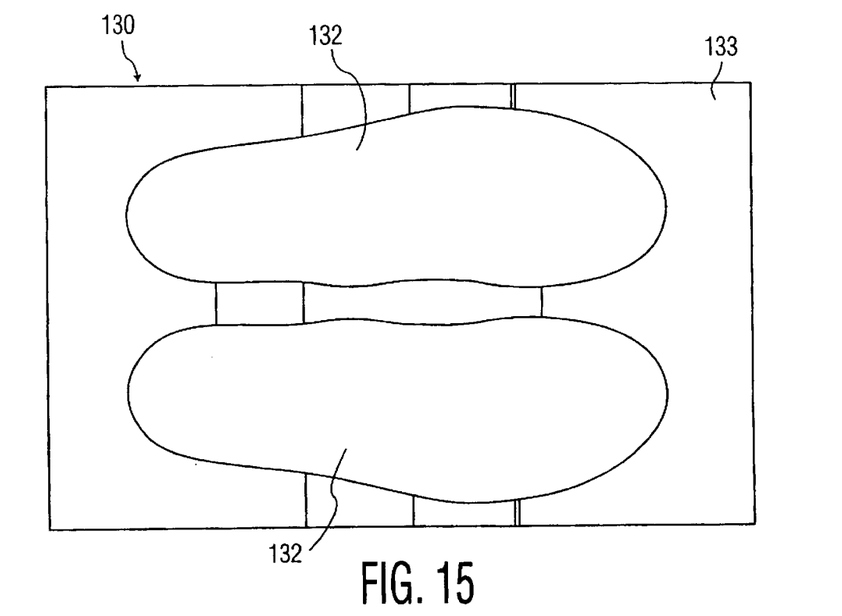
FIG. 15 is a bottom plan view of the top core mold.
Figure 16:
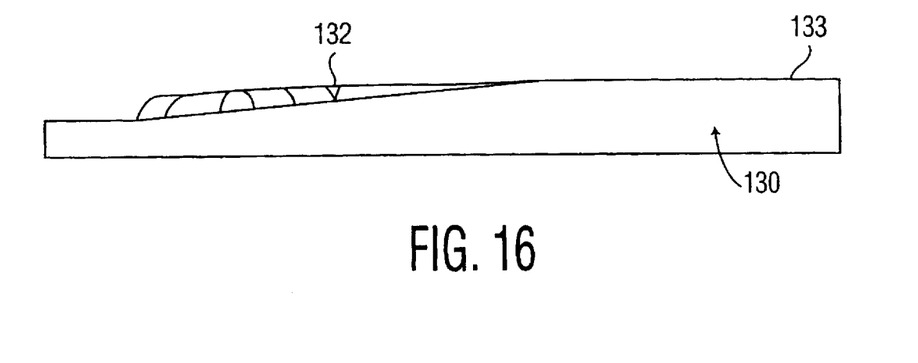
FIG. 16 is a side elevational view of the top core mold.
Figure 17:
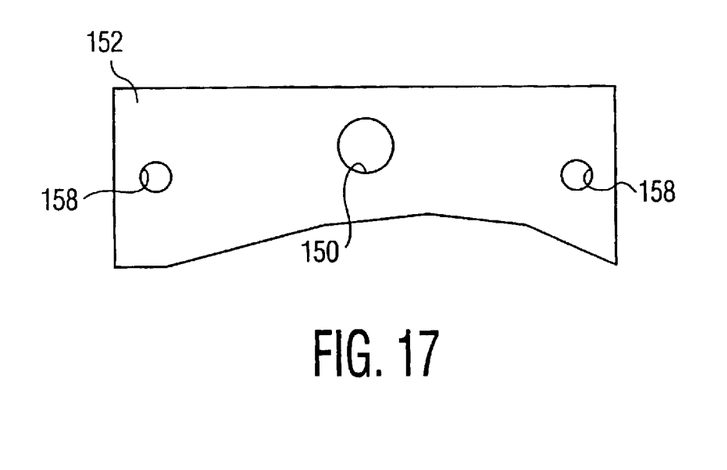
FIG. 17 is a top plan view of the adapter plate of the apparatus of FIG. 8.
Figure 18:
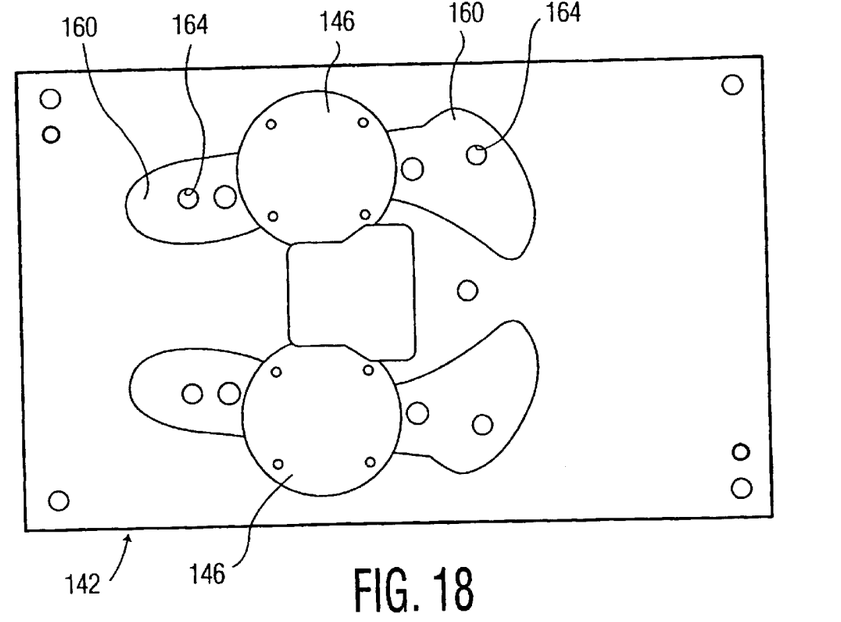
FIG. 18 is a top plan view of the base plate of the apparatus of FIG. 8.

As a further way of adjusting the height of lip 126', dam 127 can be of a constant height, but the undersurface of bottom cavity mold 112 can be cut away by different amounts at a position where connector 129 attaches thereto, shown in FIGS. 12B and 12C. By controlling the relative positioning of lip 126', as shown in FIGS. 12A–12C, it can be controlled as to whether the lower surface of insert 26 is flush with the molded urethane insole surface, as in FIG. 12B, recessed relative thereto as shown in FIG. 12C or protruding and raised from the insole surface as shown in FIG. 12A.

A top core mold 130 is provided above bottom cavity mold 112 for forming insole 10. Although the fastening is not shown, top core mold 130 is preferably pivoted to bottom cavity mold 112. Alternatively, bottom cavity mold 112 and top core mold 130 can be connected with hydraulic or pneumatic cylinders for moving the two apart and together, as is conventional in many molding operations.

Top core mold 130 has two raised areas 132 at the lower surface 133 thereof which are shaped and dimensioned to mold the upper halves of left and right shoe insoles 10. Raised areas 132 are also shaped, dimensioned and positioned with respect to corresponding lower mold cavities 114 so as to fit partially therein and to define a mold cavity for molding insoles 10. The lower surface 133 surrounding raised areas 132 is substantially flat and can be inclined or curved from the front to the rear thereof, to corresponding to flat raised sealing surface 135 of the bottom cavity mold. Thus, when the mold is closed, lower surface 133 mates with raised peripheries of sealing surface 135 around lower mold cavities to form a seal thereat and to form a closure around the molded part cavity defined by lower mold cavities 114 and raised areas 132.

Figure 19:
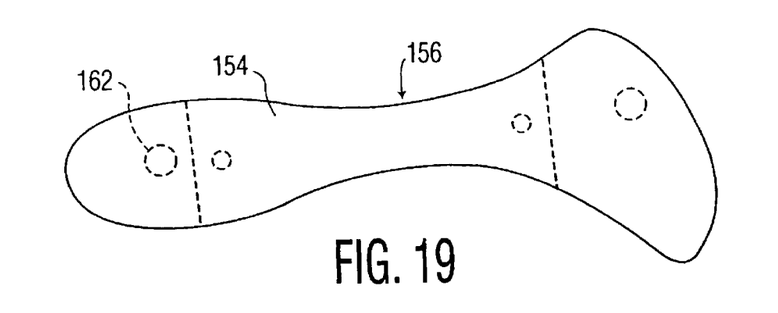
FIG. 19 is a top plan view of the lifter of the apparatus of FIG. 8.
Figure 20:
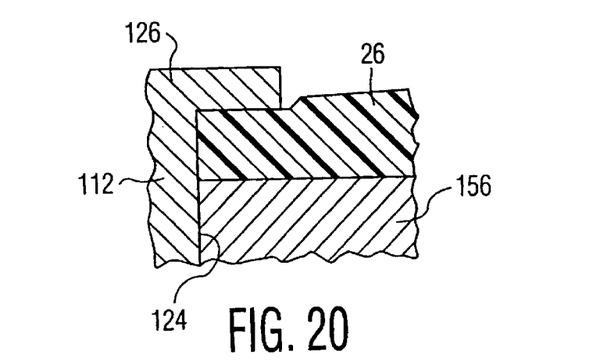
FIG. 20 is a cross-sectional view showing the insert trapped between the lifter and lip.

In accordance with the present invention, an elevator mechanism 140 is housed in a base plate 142 below bottom cavity mold 112. Specifically, elevator mechanism 140 includes two cylinders 144. Although cylinders 144 are shown superimposed on each other, this is only for simplicity in the drawing. Each cylinder 144 is housed in a respective cylinder recess 146 in base plate 142, corresponding to left and right insoles 10 to be molded. Each cylinder 144 includes a piston rod 148 that can be extended from the upper surface thereof. The upper end of each piston rod 148 is connected in a central opening 150 of an adapter plate 152. Adapter plate 152, in turn, is connected in a cut-away portion represented by area 154 between the broken lines in FIG. 19, but present on the bottom of lifter 156, by means of bolts (not shown) through openings 158 in adapter plate 152. Only one adapter plate 152 and one lifter 156 are shown for the sake of brevity in the drawings, although it will be appreciated that there are two adapter plates 152 and two lifters 156, one for each elevator opening 124 in bottom cavity mold 112. Lifter 156 has the shape of insert 26 to be provided in the mold during the molding operation. In the lowered position of elevator mechanism 140, each lifter 156 fits within a respective cylindrical recess 146 and recess extensions 160 thereof. In such position, in order to correctly align lifters 156 in recess extensions 160, the lower surfaces of lifters 156 are provided with downwardly extending posts 162 that fit within openings 164 in recess extensions 160.

Lifters 156 fit within elevator openings 124 and are spaced, prior to start of a molding operation, below the lower surfaces of inwardly extending lips 126 by an amount equal to the thickness of the inserts 26 to be supported thereby, plus a distance of about 1 mm. This additional distance permits inserts 26 to be easily loaded and positioned on the upper surfaces of lifters 156 below lip 126.

Figure 6:
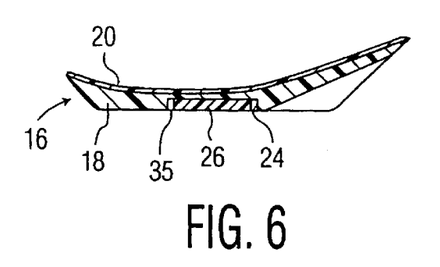
FIG. 6 is a cross-sectional view of the left insole, taken along line B—B of FIG. 1.
Figure 6A:
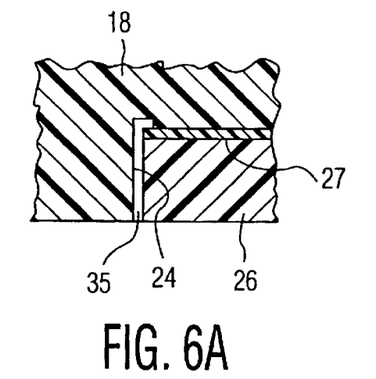
FIG. 6A is a cross-sectional view of the left insole, showing the barrier film.
Figure 7:
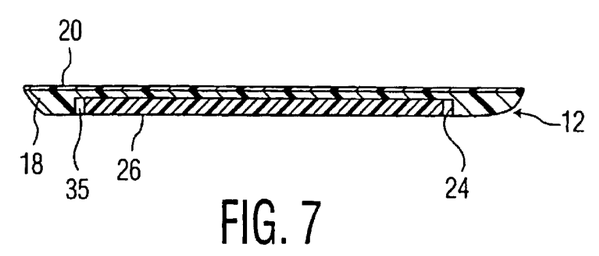
FIG. 7 is a cross-sectional view of the left insole, taken along line C—C of FIG. 1.
Figure 8:
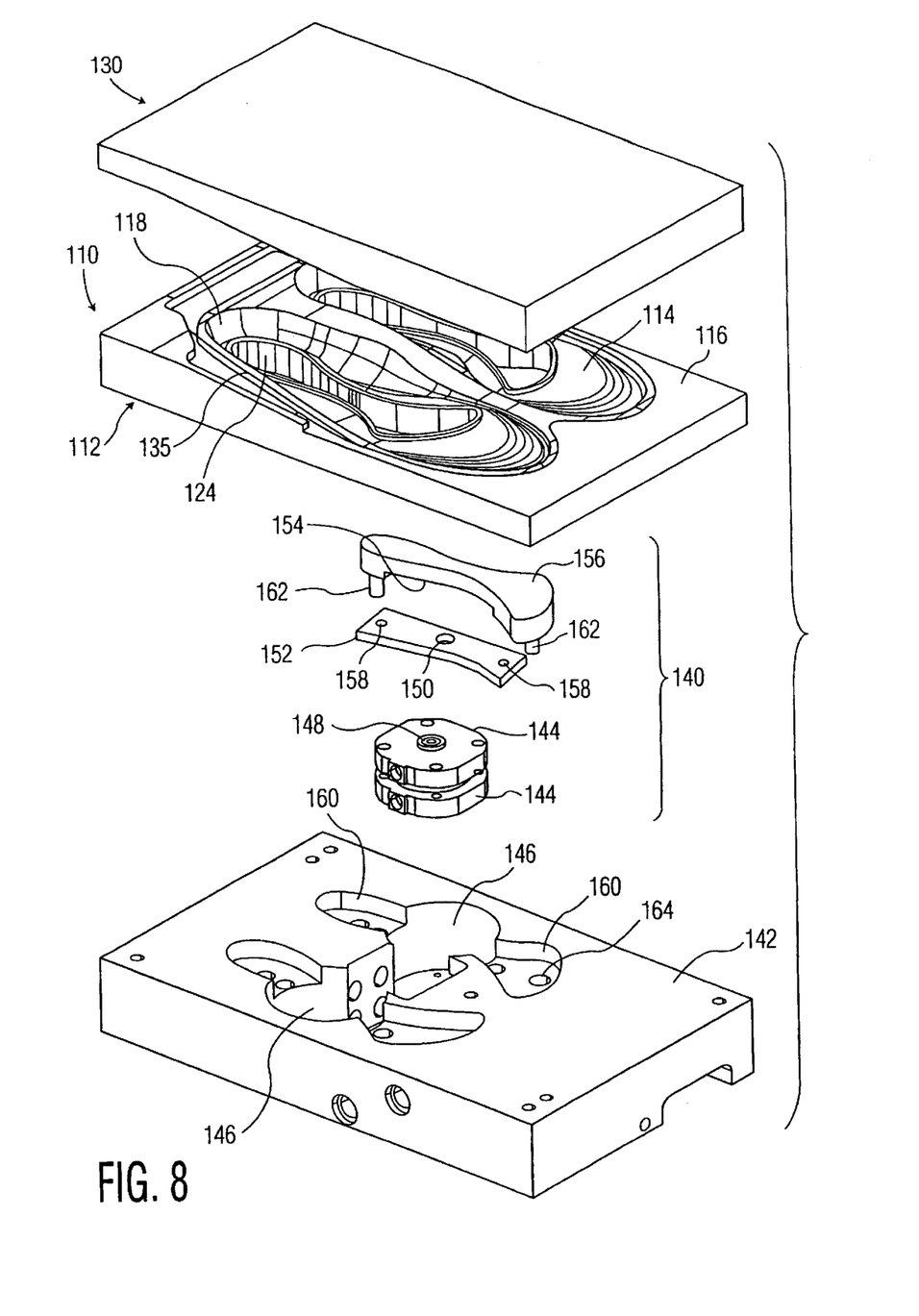
FIG. 8 is an exploded perspective view of apparatus for making the insoles of FIGS. 1 and 2.
Figure 9:
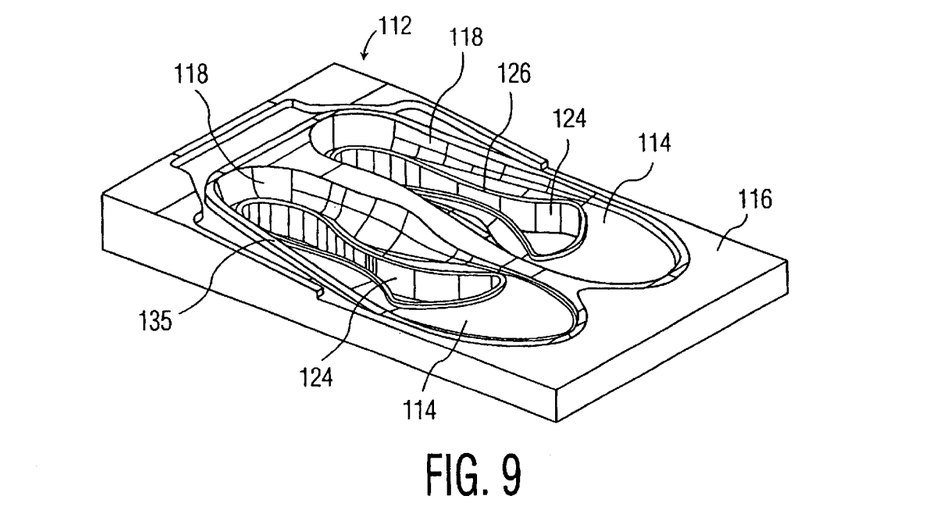
FIG. 9 is a perspective view of the bottom cavity mold of the apparatus of FIG. 8.
Figure 10:
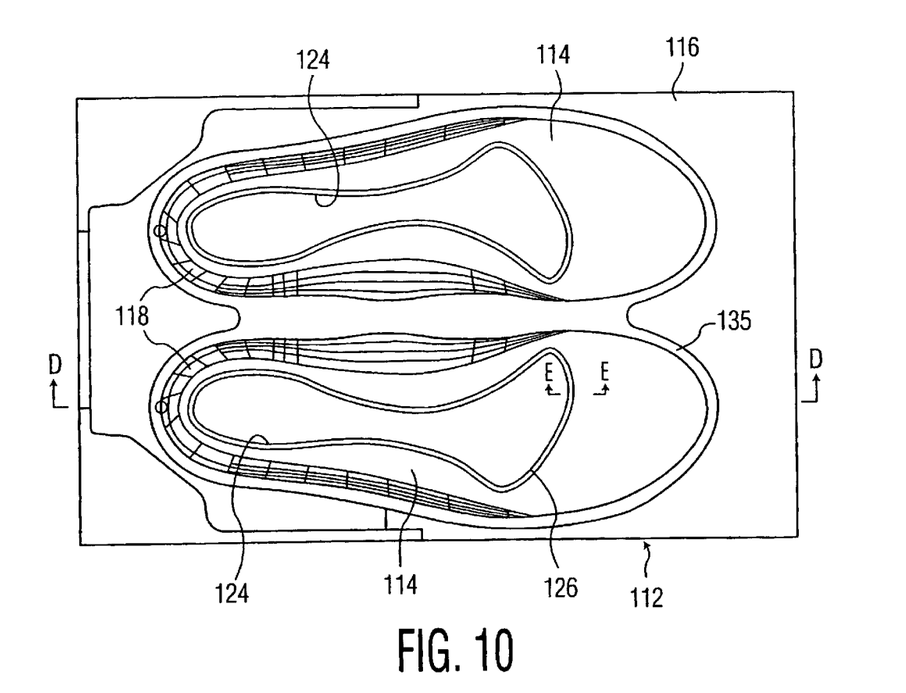
FIG. 10 is a top plan view of the bottom cavity mold.
Figure 11:
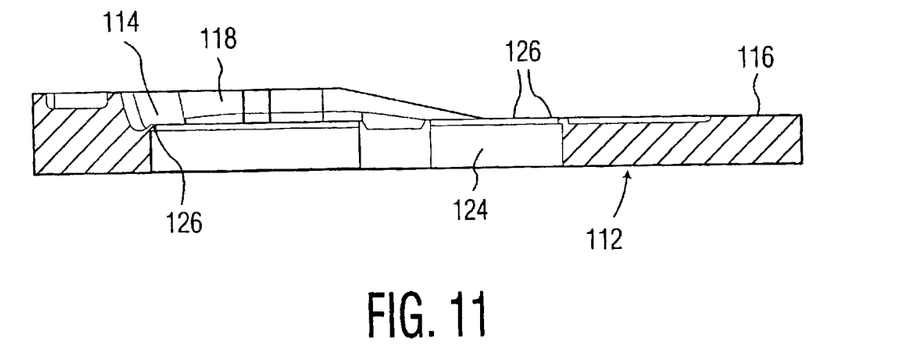
FIG. 11 is a cross-sectional view of the bottom cavity mold of FIG. 10, taken along line D—D thereof.

In operation, top cover 20 is positioned to the lower surface of top core mold 130. Piston rods 148 are lowered so as to lower lifters 156 by a distance in the range of about 0.015 inch to 5 inches (0.38 to 130 mm), and more preferably in the range of about 0.0625 inch to 0.5 inch (1.5 to 13 mm), and most preferably about 0.4 inch (10 mm). This vertical distance depends on the facility of positioning insert 26 in the mold, as well as removing the finished insole from the mold. Then, inserts 26 are positioned on lifters 156. Preferably, inserts 26 include a thin, such as 0.001 inch (0.025 mm), urethane barrier film 27 on the upper surface thereof, as shown in FIG. 6A, to prevent migration of the liquid urethane therethrough during the molding operation.

Because of the lowering of lifters 156 by about 1 mm, the upper surfaces of inserts 26 are positioned about 1 mm from the lower surfaces of lips 126. Then, weights (not shown), having the shape of but slightly smaller than the outer periphery of elevator openings 124, are placed through elevator openings 124 on top of inserts 26 to hold inserts 26 flat. Without these weights, there is the possibility that inserts 26 will not be held tightly along their entire peripheries, providing a possibility that liquid urethane can flow around the peripheral edges of inserts 26.

Alternatively, pressure can be applied to the top of the insert by an external robotic arm or an equivalent thereof to hold the insert flat, until the lifter 156 is raised and the insert is sealed on its periphery between the top of the lifter and the lip 126.

Elevator mechanism 140 is then raised. Specifically, piston rods 148 are raised so as to raise lifters 156 until the outer edges of inserts 26 are clamped or pinched between the top surfaces of lifters 156 and lips 126. As a result, a seal is provided thereat. The weights or robot supplied pressure are then removed from inserts 26. Because of the seal provided by lips 126, during the mold filling activity there is no flow of liquid urethane around the peripheral edges of inserts 26.

At this time, a top cover 20 is secured to the lower surface of top core mold 130.

Then, liquid urethane is poured into the bottom cavity mold 112 and/or top core mold 130, as is conventional. Top core mold 130 and bottom cavity mold 112 are then brought together to define the mold cavity. In such case, raised peripheries 135 of bottom cavity mold 112 and lower surface 133 of top core mold 130 form a sealing arrangement. The mold dimensions and/or retainers 125 are used to adjust the height of inserts 26. Thus, for example, inserts 26 can be adjusted to be raised, flush or recessed, as shown in FIGS. 12A–12C. In addition, the pressure applied by lifters 156 against lips 126 can be such as to just hold inserts 26 in place or can be such as to compress the peripheral edges of inserts 26. Generally, insert 26 is just held in place to its exact thickness where insert 26 is not readily compressible.

At the closing of the mold halves, the liquid urethane begins to expand and fills the mold, generating high internal cavity pressures. Thus, it is necessary that cylinders 144 provide sufficient pressure to overcome the internal molding pressures acting on lifters 156 to remain raised and level or the lifters must be locked in the sealed position during molding. The liquid urethane thereafter cures to form the finished insoles 10. However, at this time, lips 126 are positioned above the peripheral edges of inserts 26, that is, in a gap 35 between inserts 26 and the remainder of insoles 10. Therefore, when opening the mold halves, lips 126 must be pulled out of this gap 35. Inserts 26 must be sufficiently flexible to permit the molded material to be pulled out of lips 126, that is, inserts 26 cannot be too rigid. For this reason, although inserts 26 can be non-compressible, they still must be sufficiently flexible to remove them from the mold.

Just before the mold halves open, lifters 156 are lowered to release flexible inserts 26 from the clamping arrangement with lips 126. Then, the mold halves are opened. The molded assembly of the two insoles 10 is pulled off top core mold 130 as it opens, because inserts 26 are held by lips 126. The molded assembly is then pulled away from bottom cavity mold 112 and lips 126, and trimmed to form left and right insoles 10.

As shown in FIGS. 5–7 and 6A, because of the thickness of lips 126, there is a small gap 35 between the sides of inserts 26 and the lower layer 18 of insole 10. Further, a peripheral portion of the upper surface of insert 26 is free and unsecured to first layer 18 in recess 24 due to lips 126 and resulting gap 35, as shown best in FIG. 6A.

Thus, with the present invention, there is no staining of the inserts, either at the periphery due to overflow or otherwise due to penetration of the liquid urethane into the inserts. The prevention of the overflow around the periphery is due to the elevator mechanism 140 and lips 126, which seals the insert edges, preventing flow of the liquid urethane around the peripheral edge of the inserts. Further, elevator mechanism 140 permits inserts 26 to be inserted under lips 126 and thereafter clamps the peripheral edges of inserts 26 between lifters 156 of elevator mechanism 140 and lips 126. In addition to preventing flow around the periphery of inserts 26, barrier layer 27 on each insert 26 prevents penetration of the liquid urethane into and through inserts 26 during the molding operation which would otherwise cause the staining.

Although elevator mechanism has been shown as using cylinders 144 and piston rods 148 for controlling movement of lifters 156, any other suitable elevator mechanism can be used, which can withstand the pressure of the molding operation. In this regard, reference is now made to FIGS. 21 and 22 for an alternative elevator mechanism 140' in which elements that are common to the first embodiment of FIGS. 8–20 are identified by the same reference numerals.

Figure 21:
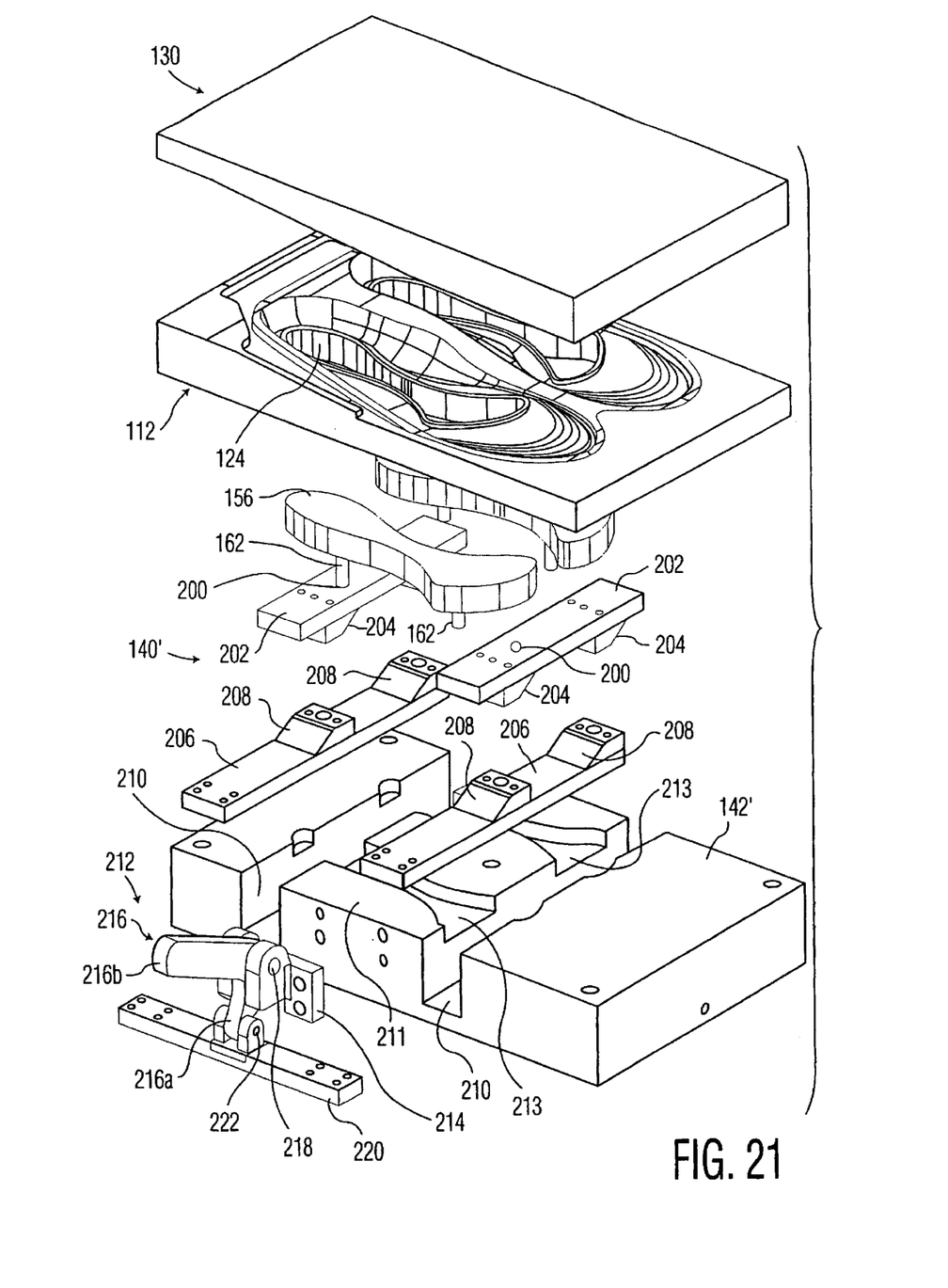
FIG. 21 is an exploded perspective view of an alternative apparatus for making the insole of FIG. 1, with a modified elevator mechanism.

Specifically, downwardly extending posts 162 of lifters 156 are fixed in openings 200 of two parallel, spaced apart, elongated rectangular upper slide plates 202 in fixed relation to each other corresponding to elevator openings 124. Two spaced apart, inclined upper cam surfaces 204 are fixed to the lower surfaces of each upper slide plate 202. In like manner, two parallel, spaced apart, elongated rectangular lower slide plates 206 are provided in alignment with and directly below upper slide plates 202. Two spaced apart, inclined lower cam surfaces 208 are fixed to the upper surfaces of lower slide plates 206, such that inclined upper cam surfaces 204 rest on inclined lower cam surfaces 208.

Base plate 142' is provided with two parallel, spaced apart, elongated rectangular deep recesses 210, each housing upper and lower slide plates 202 and 206 so as to permit sliding movement in the longitudinal direction thereof. The raised portion 211 of base plate 142' between recesses 210 is provided with two shallow recesses 213 which are arranged generally perpendicular to deep recesses 210 and which are shaped and dimensioned to receive lifters 156.

A lever mechanism 212 is provided to raise lifters 156. Lever mechanism 212 includes a block 214 secured to a side surface of raised portion 211 of base plate 142' between one end of deep recesses 210. An L-shaped lever 216 is pivotally mounted to block 214 by a pivot pin 218. The lower leg 216a of lever 216 is pivotally mounted to a plate 220 by a pivot pin 222. The opposite ends of plate 220 are connected to lower slide plates 206.

Figure 22:
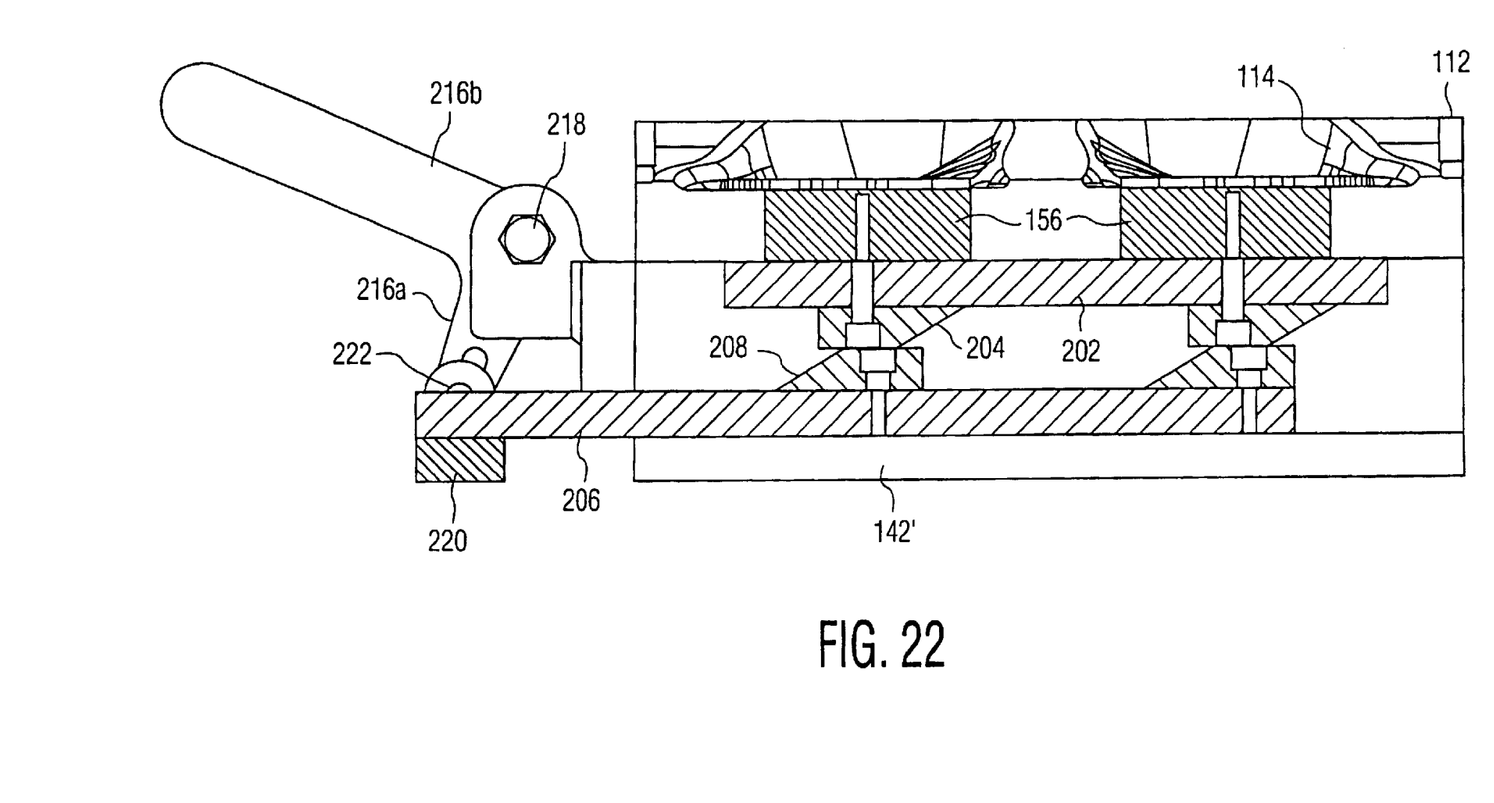
FIG. 22 is a cross-sectional view of the apparatus of FIG. 21, showing the operation thereof.

In operation, as the upper leg 216b of lever 216 is pushed up in FIG. 22 so as to pivot lever 216 in the clockwise direction, plate 220 moves away from base plate 142'. As a result, lower slide plates 206 are pulled slightly out of deep recesses 210. Because of this movement, upper cam surfaces 204 ride up on lower cam surfaces 208, resulting in raising of lifters 156. Because lifters 156 are constrained within elevator openings 124, lifters 156 can only move in a vertical direction.

Other suitable elevator mechanisms can also be provided, for example, screw arrangements, rack and pinion arrangements, and the like.

Further, although lip 126 has been described as being stationary, with lifters 156 being raised and lowered, it is possible within the context of the present invention to move lips 126 up and down and keep lifters 156 stationary, or to relatively move both lips 126 and lifters 156 up and down.

It will be appreciated that modifications can be made to the present invention within the scope of the claims. For example, while the elevator opening and elevator mechanism have been described in relation to lower cavity mold 112, the elevator opening and elevator mechanism can be provided in addition to, or alternatively with, top core mold 130.

From this description of specific preferred embodiments, it will be appreciated that the present invention is not limited to those precise embodiments and that various changes and modifications can be effected by one of ordinary skill in the art without departing from the scope or spirit of the invention as defined by the appended claims.

What is claimed is:

1. An apparatus for insert molding, comprising:
   an upper mold half;
   a lower mold half for mating with said upper mold half to provide a molded part cavity therein;
   at least one of said lower mold half and said upper mold half including:
      an elevator opening having a peripheral inwardly directed lip located at a cavity side of said elevator opening; and
      an elevator mechanism including:
         a lifter for supporting an insert to be secured to a molded article during a molding operation, and
         a lifting arrangement for raising and lowering said lifter through said elevator opening such that an entire peripheral edge of the insert supported on said lifter is clamped between said lifter and said lip when said lifting arrangement moves said lifter adjacent said inwardly directed lip.

2. The apparatus according to claim 1, wherein said lifting arrangement includes:
   a base positioned outside a respective said mold half on a side opposite said molded part cavity; and
   a cylinder mounted to said base and including a movable piston rod connected with said lifter for raising and lowering said lifter.

3. The apparatus according to claim 2, wherein said base includes a recess for mounting said cylinder.

4. The apparatus according to claim 1, further comprising a retainer removably connected to said respective mold half within said elevator opening, said retainer including a dam flush with and removable from an inner wall defining said elevator opening, and said retainer further including said inwardly extending lip connected to an end of said dam.

5. The apparatus according to claim 4, wherein said retainer further includes an outwardly extending connector connected with an opposite end of said dam and removably secured to a surface of the respective mold half.

6. The apparatus according to claim 1, wherein said lifting arrangement includes:
   a first slide plate having a first inclined cam surface, said lifter being connected to said first slide plate;
   a second slide plate having a second inclined cam surface in contact with said first inclined cam surface; and
   a moving arrangement for sliding said second slide plate relative to said first slide plate in order to raise and lower said first slide plate and said lifter.

7. The apparatus according to claim 1, which is adapted for molding shoe insoles and wherein:
said lower mold half includes:
two lower mold cavities corresponding to left and right insoles to be molded;
one said elevator opening in a tower portion of each said lower mold cavity; and
one said inwardly directed lip at an upper portion of each said elevator opening;
said elevator mechanism includes two said lifters for supporting an insert in correspondence with each said lower mold cavity; and
said lifting arrangement raises and lowers said two lifters such that a peripheral edge of each insert supported on each said respective lifter is clamped between said lifter and the respective lip when said lifting arrangement raises said lifters.

8. An apparatus for insert molding, comprising:
an upper mold half;
a lower mold half for mating with said upper mold half to provide a molded part cavity therein;
at least one of said lower mold half and said upper mold half including:
an elevator opening;
an inwardly directed lip at a cavity side of said elevator opening; and
an elevator mechanism including:
a lifter for supporting an insert to be secured to a molded article during a molding operation;
a lifting arrangement for raising and lowering said lifter through said elevator opening such that a peripheral edge of the insert supported on said lifter is clamped between said lifter and said lip when said lifting arrangement moves said lifter adjacent said inwardly directed lip; and
a retainer removably connected to said respective mold half within said elevator opening, said retainer including a dam flush with and removable from an inner wall defining said elevator opening, and said retainer further including said inwardly extending lip connected to an end of said dam.

9. The apparatus according to claim 8, wherein said retainer further includes an outwardly extending connector connected with an opposite end of said dam and removably secured to a surface of the respective mold half.

10. The apparatus according to claim 8, wherein said lifting arrangement includes:
a first slide plate having a first inclined cam surface, said lifter being connected to said first slide plate;
a second slide plate having a second inclined cam surface in contact with said first inclined cam surface; and
a moving arrangement for sliding said second slide plate relative to said first slide plate in order to raise and lower said first slide plate and said lifter.

11. The apparatus according to claim 8, which is adapted for molding shoe insoles and wherein:
said lower mold half includes:
two lower mold cavities corresponding to left and right insoles to be molded;
one said elevator opening in a lower portion of each said lower mold cavity; and
one said inwardly directed lip at an upper portion of each said elevator opening;
said elevator mechanism includes two said lifters for supporting an insert in correspondence with each said lower mold cavity; and
said lifting arrangement raises and lowers said two lifters such that a peripheral edge of each insert supported on each said respective lifter is clamped between said lifter and the respective lip when said lifting arrangement raises said lifters.

\* \* \* \* \*